US012699519B2

(12) United States Patent
Pearson

(10) Patent No.: US 12,699,519 B2
(45) Date of Patent: **\*Aug. 4, 2026**

(54) SOFT CAPACITY CONSTRAINTS FOR STORAGE ASSIGNMENT IN A DISTRIBUTED ENVIRONMENT

(71) Applicant: Google LLC, Mountain View, CA (US)

(72) Inventor: Alan Pearson, Seattle, WA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/916,946

(22) Filed: Oct. 16, 2024

(65) Prior Publication Data

US 2025/0036297 A1      Jan. 30, 2025

Related U.S. Application Data

(63) Continuation of application No. 17/691,389, filed on Mar. 10, 2022, now Pat. No. 12,141,455.

(51) Int. Cl.
*G06F 3/06* (2006.01)

(52) U.S. Cl.
CPC .......... *G06F 3/0635* (2013.01); *G06F 3/0604* (2013.01); *G06F 3/0656* (2013.01); *G06F 3/0659* (2013.01); *G06F 3/067* (2013.01)

(58) Field of Classification Search
CPC .... G06F 3/0635; G06F 3/0604; G06F 3/0656; G06F 3/0659; G06F 3/067
See application file for complete search history.

(56) References Cited

U.S. PATENT DOCUMENTS

| | | | |
|---|---|---|---|
| 2006/0136525 A1* | 6/2006 | Akelbein | .............. G06F 3/0685 |
| 2019/0056877 A1 | 2/2019 | Kolesnik et al. | |
| 2020/0065415 A1 | 2/2020 | Estanislao et al. | |
| 2023/0026185 A1* | 1/2023 | O'Riordan | ............ G06F 3/0665 |

FOREIGN PATENT DOCUMENTS

WO      2004021224 A1      3/2004

OTHER PUBLICATIONS

International Search Report and Written Opinon for International Application No. PCT/US2023/014780 dated May 17, 2023. 16 pages.
First Examination Report for Indian Patent Application No. 202447067106 dated May 21, 2026. 8 pages.

* cited by examiner

*Primary Examiner* — Masud K Khan
(74) *Attorney, Agent, or Firm* — Lerner David LLP

(57)      ABSTRACT
A system and method for balancing data storage among a plurality of groups of computing devices, each group comprising one or more respective computing devices, each group having an available storage capacity. The method may involve, for each group of computing devices, determining an amount of used storage at the group of computing devices exceeding a predefined first threshold value that is less than the available storage capacity and calculating a storage cost based on the determined amount of used storage exceeding the predefined first threshold value, determining a total storage cost of the plurality of groups of computing devices based on a sum of the calculated storage costs, determining a transfer of one or more projects between the groups of computing devices that reduces the total storage and directing the plurality of groups of computing devices to execute the determined transfer.

20 Claims, 6 Drawing Sheets

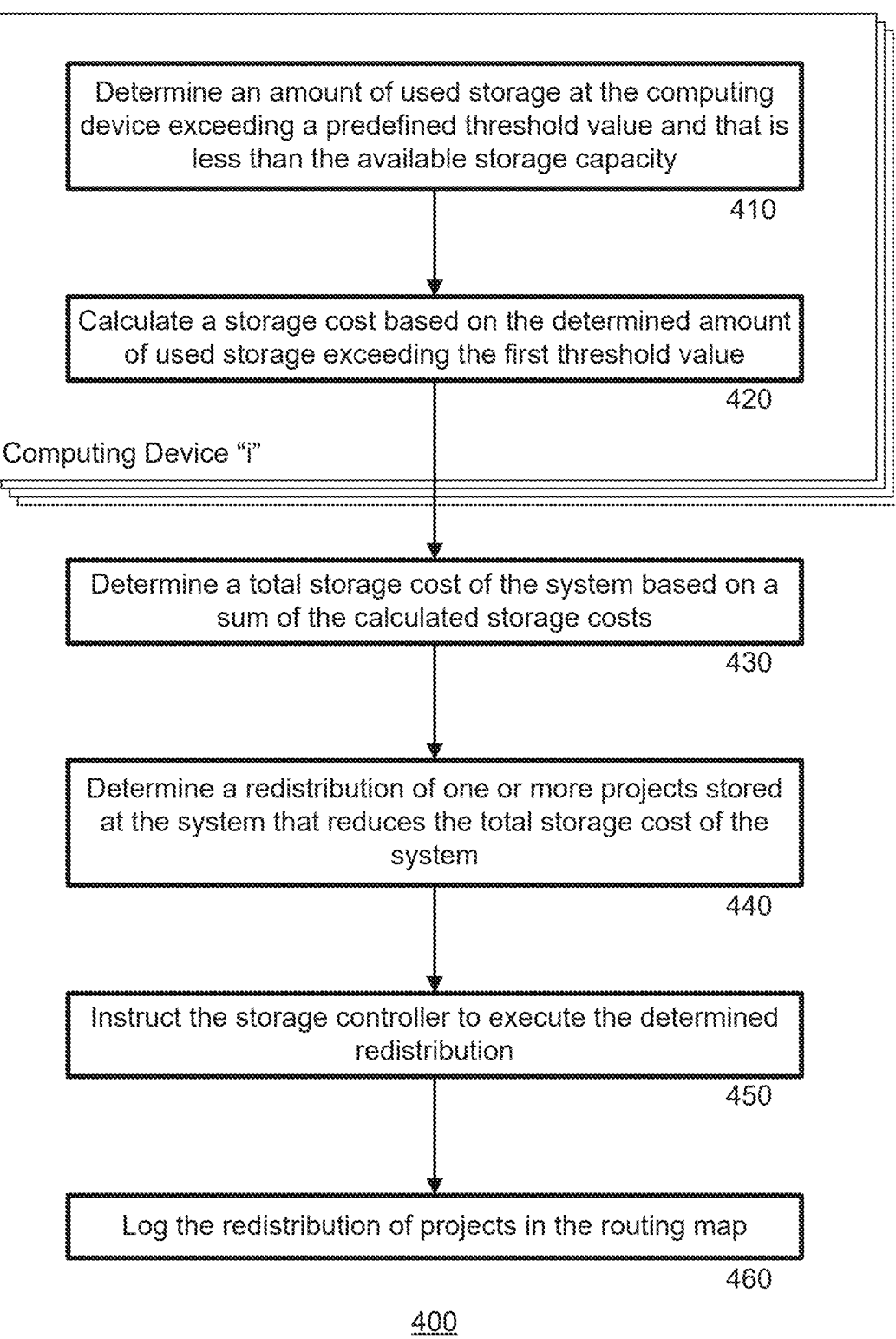

Determine an amount of used storage at the computing device exceeding a predefined threshold value and that is less than the available storage capacity

410

Calculate a storage cost based on the determined amount of used storage exceeding the first threshold value

420

Computing Device "i"

Determine a total storage cost of the system based on a sum of the calculated storage costs

430

Determine a redistribution of one or more projects stored at the system that reduces the total storage cost of the system

440

Instruct the storage controller to execute the determined redistribution

450

Log the redistribution of projects in the routing map

SOFT CAPACITY CONSTRAINTS FOR STORAGE ASSIGNMENT IN A DISTRIBUTED ENVIRONMENT

CROSS-REFERENCE TO RELATED APPLICATIONS

The present application is a continuation of U.S. patent application Ser. No. 17/691,389, filed on Mar. 10, 2022, the disclosure of which is hereby incorporated herein by reference.

BACKGROUND

Cloud computing systems sometimes include a distributed data analysis engine, which operates in multiple data centers distributed globally. Each data center contains one or more servers. Users of such cloud computing systems may create organizations and projects. Within a project, the distributed data analysis engine allows users to create data sets and tables. Internally, tables are partitioned into units of data replication, called storage sets. Each storage set corresponds to one or more files stored on a server. While users typically query their own data sets, it is also possible for one user to share data sets with another user or make them publicly available to many users. Multiple data sets may be joined together at query time, which potentially requires the system to read data from a large number of distinct data sets, possibly belonging to arbitrary users.

Data sets may be strategically stored across the distributed computing system. Typically, the techniques for strategic data storage involve identifying projects with shared data sets and storing the projects with the most frequently shared data sets on the same computing device within the distributed computing system. At each computing device, a growth buffer may be reserved in order to allow the projects stored at the computing device to grow without reaching the physical limit of the computing device's storage.

On the one hand, maintaining large growth buffers is costly since they result in large amounts of idle storage within the computing system. On the other hand, maintaining too small a growth buffer is also detrimental, since it could lead to storage errors as projects stored at a computing device grow over time.

BRIEF SUMMARY

The present disclosure utilizes one or more soft buffers in order to control balancing of data storage among the computing devices of the computing system. An assignment solver may analyze storage costs, among other factors, based on the soft buffers. A set of project assignments that minimizes storage costs may be an optimized storage solution.

One aspect of the disclosure is directed to a method of balancing data storage among a plurality of groups of computing devices, each group comprising one or more respective computing devices, each group having an available storage capacity. The method may include: for each group of computing devices: determining, by one or more processors, an amount of used storage at the group of computing devices exceeding a predefined first threshold value that is less than the available storage capacity; calculating, by the one or more processors, a storage cost based on the determined amount of used storage exceeding the predefined first threshold value; determining, by the one or more processors, a total storage cost of the plurality of groups of computing devices based on a sum of the calculated storage costs; determining, by the one or more processors, a transfer of one or more projects between the groups of computing devices that reduces the total storage; and directing, by the one or more processors, the plurality of groups of computing devices to execute the determined transfer.

In some examples, the available storage capacity of each group of computing devices further includes a hard buffer to which storage of new projects at the group of computing devices is restricted, wherein the first threshold value is greater than a difference between the available storage capacity and a size of the hard buffer.

In some examples, calculating the storage cost may include multiplying the determined amount of used storage exceeding the predefined first threshold value by a predefined first constant value.

In some examples, the method may further include, for each group of computing devices, determining, by the one or more processors, an amount of used storage at the group of computing devices exceeding a predefined second threshold value that is less than the available storage capacity, the second threshold value being greater than the first threshold value. Calculating the storage cost may involve multiplying the determined amount of used storage exceeding the predefined second threshold value by a predefined second constant value. In some examples, the predefined second constant value may be greater than or equal to the predefined first constant value.

In some examples, the method may further include, for each group of computing devices, determining, by the one or more processors, an amount of used storage at the group of computing devices exceeding n predefined threshold values, each predefined threshold value being less than the available storage capacity, in which n is an integer equal to or greater than two. Calculating the storage cost may involve multiplying the determined amount of used storage by one of n predefined constant values depending on how many of the n predefined threshold values the amount of used storage at the group of computing devices exceeds.

In some examples, calculating the storage cost may include inputting the determined amount of used storage exceeding the predefined first threshold value to a non-linear function.

In some examples, the method may further include: determining, by the one or more processors, one or more secondary cost factors associated with transferring the one or more projects between the plurality of groups of computing devices; assigning, by the one or more processors, a first weighting value to the calculated total storage cost and a respective weighting value to each of the one or more secondary factors; and calculating, by the one or more processors, a sum of the weighted calculated total storage cost and the weighted secondary cost factors. The determined transfer of the one or more projects between the groups of computing devices may reduce the calculated sum.

In some examples, the one or more secondary cost factors may include a network bandwidth cost of transferring the one or more projects between the groups of computing devices. Additionally or alternatively, the one or more secondary cost factors may include a network communication cost of communicating data between the groups of computing devices Another aspect of the disclosure is directed to a system of balancing data storage among a plurality of groups of computing devices, each group comprising one or more respective computing devices, each group having an available storage capacity. The system may include one or more memories and one or more processors in communication with the one or more memories. The one or more processors may be configured to: for each group of computing devices: determine an amount of used storage at the group of computing devices exceeding a predefined first threshold value that is less than the available storage capacity; and calculate a storage cost based on the determined amount of used storage exceeding the predefined first threshold value; determine a total storage cost of the plurality of groups of computing devices based on a sum of the calculated storage costs; determine a transfer of one or more projects between the groups of computing devices that reduces the total storage; and direct the plurality of groups of computing devices to execute the determined transfer.

In some examples, the available storage capacity of each group of computing devices may further include a hard buffer to which storage of new projects at the group of computing devices is restricted. The first threshold value may be greater than a difference between the available storage capacity and a size of the hard buffer.

In some examples, the one or more processors may be configured to calculate the storage cost by multiplying the determined amount of used storage exceeding the predefined first threshold value by a predefined first constant value.

In some examples, the one or more processors may be configured to, for each group of computing devices, determine an amount of used storage at the group of computing devices exceeding a predefined second threshold value that is less than the available storage capacity, the second threshold value being greater than the first threshold value. The one or more processors may be configured to calculate the storage cost by multiplying the determined amount of used storage exceeding the predefined second threshold value by a predefined second constant value.

In some examples, the predefined second constant value may be greater than or equal to the predefined first constant value.

In some examples, the one or more processors may be configured to, for each group of computing devices, determine an amount of used storage at the group of computing devices exceeding n predefined threshold values, each predefined threshold value being less than the available storage capacity, in which n is an integer equal to or greater than two. The one or more processors may be configured to calculate the storage cost by multiplying the determined amount of used storage by one of n predefined constant values depending on how many of the n predefined threshold values the amount of used storage at the group of computing devices exceeds.

In some examples, the one or more processors may be configured to calculate the storage cost by inputting the determined amount of used storage exceeding the predefined first threshold value to a non-linear function.

In some examples, the one or more processors may be configured to: determine one or more secondary cost factors associated with transferring the one or more projects between the plurality of groups of computing devices; assign a first weighting value to the calculated total storage cost and a respective weighting value to each of the one or more secondary factors; and calculate a sum of the weighted calculated total storage cost and the weighted secondary cost factors. The determined transfer of the one or more projects between the groups of computing devices may reduce the calculated sum.

In some examples, the one or more secondary cost factors may include a network bandwidth cost of transferring the one or more projects between the groups of computing devices. Additionally or alternatively, the one or more secondary cost factors may include a network communication cost of communicating data between the groups of computing devices.

BRIEF DESCRIPTION OF THE DRAWINGS

FIG. 4 is a flow diagram of an example balancing routine according to an aspect of the present disclosure.

DETAILED DESCRIPTION

Overview

Figure 1:
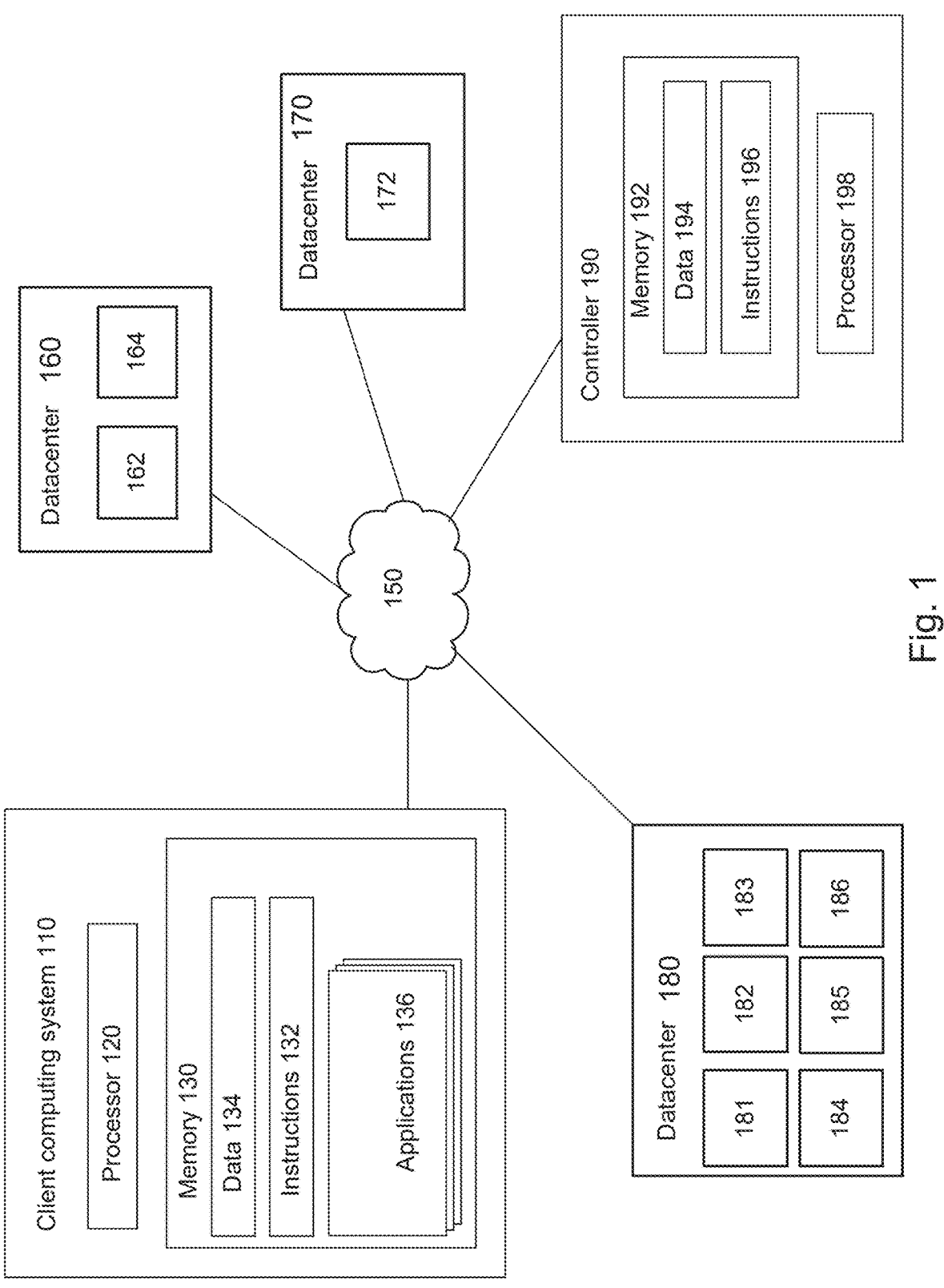
FIG. 1 is a block diagram of an example system in accordance with an aspect of the present disclosure.

The present disclosure utilizes one or more soft buffers in order to control balancing of data storage among the computing devices of the computing system. This is accomplished using an assignment solver to analyze storage costs among the computing devices of the computing system based on the soft buffers of each computing device, whereby a storage solution that minimizes the storage costs may be an optimized storage solution. A weighted cost may be assigned to storage in excess of the soft buffers, such that stored data in excess of the soft buffer may be assigned a greater cost than stored data that does not exceed the cost buffer. Based on the analysis, the assignment solver can assign future projects to computing devices with relatively low storage costs, reassign current projects from computing devices with relatively high storage costs to computing devices with relatively low storage costs, or both.

In some examples, each computing device may be assigned a single linear soft buffer, whereby storage in excess of the soft buffer is multiplied by a weighting value K. In other examples, computing devices may be assigned multiple soft buffers. For instance, different weighting values $K_1$, $K_2$ . . . $K_n$ may be assigned to different ranges of storage capacity, such that the weighting values of the buffers increase in magnitude as storage at the computing device increases. In other examples, the multiple soft buffers may be implemented as one or more non-linear weighting values, such as an exponential or polynomial value. In any of the above cases, as storage capacity of the computing device fills, more soft buffers are crossed, or both, the cost of storing additional data at the computing device increases. The increasing costs have the effect of lowering the relative cost of storing the same data at a relatively underutilized computing device, thus incentivizing the assignment solver to assign new projects or even reassign current projects to the underutilized computing device.

In some examples, the storage cost optimization may be the sole factor used by the assignment solver to balance storage among the plurality of computing devices. In other examples, the storage cost optimization may be one of multiple factors used to balance storage. For instance, in the case of reassigning a previously assigned project, the weighted storage costs for each computing device may be factored against the cost of moving the project from one computing device to another computing device. Additionally or alternatively, the weighted storage costs for each computing device may be factored against the communication costs resulting from assigning projects that share a data set to separate computing devices. These factors, along with other factors, may be balanced by the assignment solver in order to derive a more holistic cost optimization for both storage and communication at the computing system.

While the concepts described herein may be used to manage data across a plurality of computing devices, it should be understood that such concepts may also be applied to other network architectures, such as those utilizing cells.

Example Systems

FIG. 1 illustrates an example system 100 including a distributed computing environment. A plurality of datacenters 160, 170, 180 may be communicatively coupled, for example, over a network 150. The datacenters 160, 170, 180 may further communicate with one or more client devices, such as client 110, over the network 150. Thus, for example, the client 110 may execute operations in "the cloud." In some examples, the datacenters 160, 170, 180 may further communicate with a controller 190.

The datacenters 160-180 may be positioned a considerable distance from one another. For example, the datacenters may be positioned in various countries around the world. Each datacenter 160, 170, 180 may include one or more computing devices, such as processors, servers, shards, cells, or the like. For example, as shown in FIG. 1, datacenter 160 includes computing devices 162, 164, datacenter 170 includes computing device 172, and datacenter 180 includes computing devices 181-186. Programs may be executed across these computing devices, for example, such that some operations are executed by one or more computing devices of a first datacenter while other operations are performed by one or more computing devices of a second datacenter. In some examples, the computing devices in the various datacenters may have different capacities. For example, the different computing devices may have different processing speeds, workloads, etc. While only a few of these computing devices are shown, it should be understood that each datacenter 160, 170, 180 may include any number of computing devices, and that the number of computing devices in a first datacenter may differ from a number of computing devices in a second datacenter. Moreover, it should be understood that the number of computing devices in each datacenter 160-180 may vary over time, for example, as hardware is removed, replaced, upgraded, or expanded.

In some examples, each datacenter 160-180 may also include a number of storage devices (not shown), such as hard drives, random access memory, disks, disk arrays, tape drives, or any other types of storage devices. The storage devices may implement any of a number of architectures and technologies, including, but not limited to, direct attached storage (DAS), network attached storage (NAS), storage area networks (SANs), fibre channel (FC), fibre channel over Ethernet (FCOE), mixed architecture networks, or the like. The datacenters may include a number of other devices in addition to the storage devices, such as cabling, routers, etc. Further, in some examples the datacenters 160-180 may be virtualized environments. Further, while only a few datacenters 160-180 are shown, numerous datacenters may be coupled over the network 150 and/or additional networks.

In some examples, the controller 190 may communicate with the computing devices in the datacenters 160-180, and may facilitate the execution of programs. For example, the controller 190 may track the capacity, status, workload, or other information of each computing device, and use such information to assign tasks. The controller 190 may include a processor 198 and memory 192, including data 194 and instructions 196, similar to the client 110 described above. In other examples, such operations may be performed by one or more of the computing devices in one of the datacenters 160-180, and an independent controller may be omitted from the system.

Each client 110 may be, for example, a computer intended for use by a person or an entity. The client 110 may have all the internal components normally found in a personal computer such as a central processing unit (CPU), CD-ROM, hard drive, and a display device, for example, a monitor having a screen, a projector, a touch-screen, a small LCD screen, a television, or another device such as an electrical device that can be operable to display information processed by processor 120, speakers, a modem and/or network interface device, user input, such as a mouse, keyboard, touch screen or microphone, and all of the components used for connecting these elements to one another. Moreover, computers in accordance with the systems and methods described herein may include devices capable of processing instructions and transmitting data to and from humans and other computers including general purpose computers, PDAs, tablets, mobile phones, smartwatches, network computers lacking local storage capability, set top boxes for televisions, and other networked devices.

The client 110 may contain a processor 120, memory 130, and other components typically present in general purpose computers. The memory 130 can store information accessible by the processor 120, including instructions 132 that can be executed by the processor 120. Memory can also include data 134 that can be retrieved, manipulated or stored by the processor 120. The memory 130 may be a type of non-transitory computer readable medium capable of storing information accessible by the processor 120, such as a hard-drive, solid state drive, tape drive, optical storage, memory card, ROM, RAM, DVD, CD-ROM, write-capable, and read-only memories. The processor 120 can be a well-known processor or other lesser-known types of processors. Alternatively, the processor 120 can be a dedicated controller such as an ASIC.

The instructions 132 can be a set of instructions executed directly, such as machine code, or indirectly, such as scripts, by the processor 120. In this regard, the terms "instructions," "steps" and "programs" can be used interchangeably herein. The instructions 132 can be stored in object code format for direct processing by the processor 120, or other types of computer language including scripts or collections of independent source code modules that are interpreted on demand or compiled in advance.

The data 134 can be retrieved, stored or modified by the processor 120 in accordance with the instructions 132. For instance, although the system and method is not limited by a particular data structure, the data 134 can be stored in computer registers, in a relational database as a table having a plurality of different fields and records, or XML documents. The data 134 can also be formatted in a computer-readable format such as, but not limited to, binary values, ASCII or Unicode. Moreover, the data 134 can include information sufficient to identify relevant information, such as numbers, descriptive text, proprietary codes, pointers, references to data stored in other memories, including other network locations, or information that is used by a function to calculate relevant data.

Applications 136 may be used for any of a variety of operations. The applications 136 may, for example, be downloaded, executable from the instructions 132, or remotely accessed. In some examples, the application may be remotely executed. For example, applications on the client device may be executed in the cloud.

Although FIG. 1 functionally illustrates the processor 120 and memory 130 as being within the same block, the processor 120 and memory 130 may actually include multiple processors and memories that may or may not be stored within the same physical housing. For example, some of the instructions 132 and data 134 can be stored on a removable CD-ROM and others within a read-only computer chip. Some or all of the instructions and data can be stored in a location physically remote from, yet still accessible by, the processor 120. Similarly, the processor 120 can actually include a collection of processors, which may or may not operate in parallel.

Client 110, datacenters 160-180, and control 190 can be capable of direct and indirect communication such as over network 150. For example, using an Internet socket, a client 110 can connect to a service operating on remote servers through an Internet protocol suite. Servers can set up listening sockets that may accept an initiating connection for sending and receiving information. The network 150, and intervening nodes, may include various configurations and protocols including the Internet, World Wide Web, intranets, virtual private networks, wide area networks, local networks, private networks using communication protocols proprietary to one or more companies, Ethernet, WiFi (e.g., 702.71, 702.71b, g, n, or other such standards), and HTTP, and various combinations of the foregoing. Such communication may be facilitated by a device capable of transmitting data to and from other computers, such as modems (e.g., dial-up, cable or fiber optic) and wireless interfaces.

Figure 2:
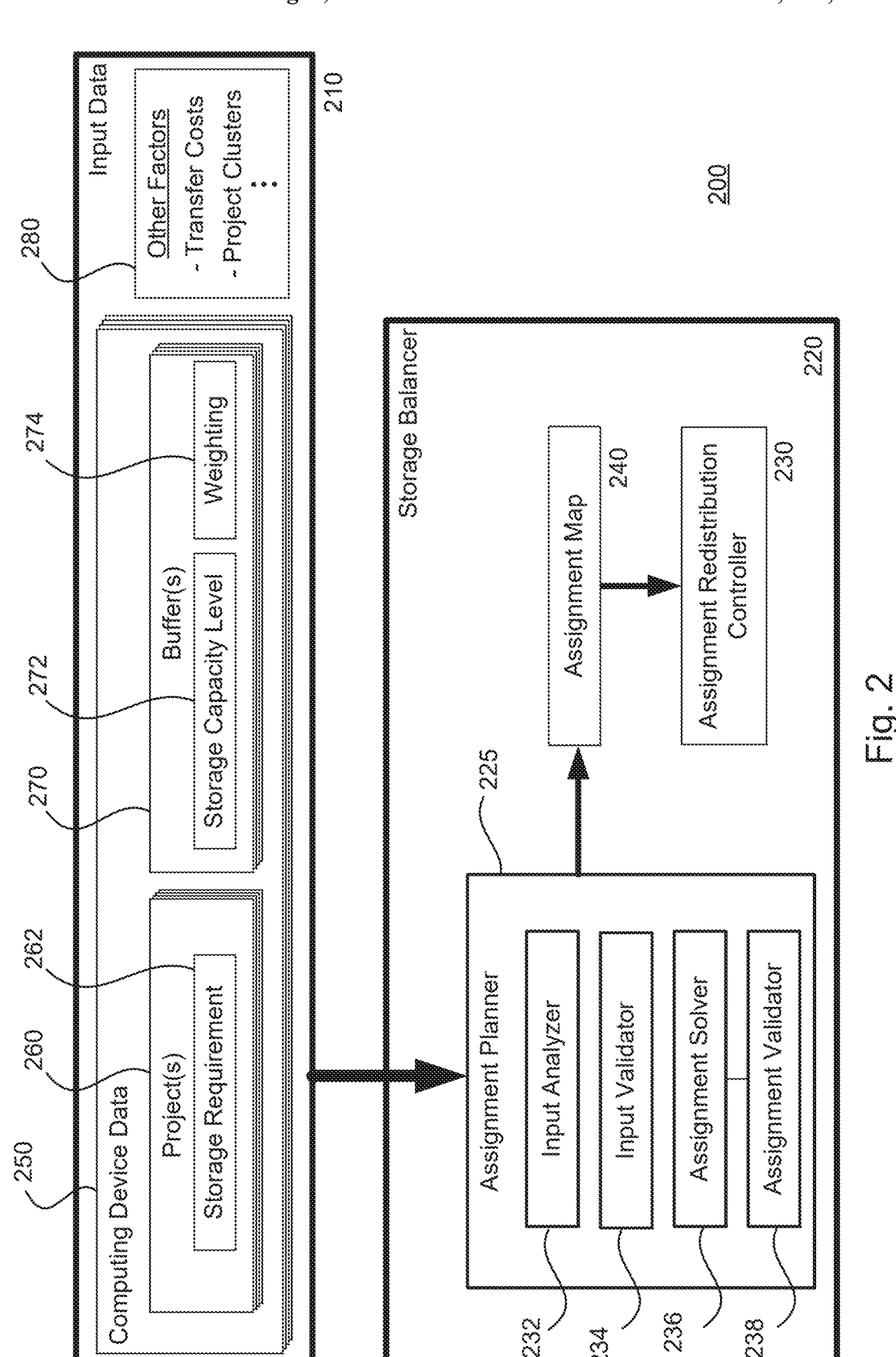
FIG. 2 is a block diagram of an example balancer in accordance with an aspect of the present disclosure.

FIG. 2 illustrates an example architecture of a system 200 for optimizing the assignment of projects to computing devices within the distributed network. The system 200 may reside, for example, on a computing device in one of the datacenters 160-180 of FIG. 1, on the controller 190 of FIG. 1, or on some combination thereof. The system 200 includes a balancer 220, which may be responsible for assigning reservations to computation servers in a balanced fashion. For example, the balancer 220 may balance allocation of tasks within a datacenter or among a global distributed system. The balancer 220 may, for example, compute explicit project-to-server assignment mappings to achieve proper load balancing. It may handle both static query routing, when all servers are available, and dynamic query routing, when servers are drained. Additionally, the balancer 220 may provide a robust way to publish these assignments to all components in a data analysis engine that use this information.

The load balancer 250 may include an assignment planner 225, which may run as a sub-component in the balancer 220. For example, the assignment planner 225 may be a module, such as a C++ or other type of module. In some instances, the assignment planner 225 may replace an existing routing computation component. While in some examples a single assignment planner may produce assignments for each region, in other examples additional or fewer assignment planners may be implemented. For example, an assignment planner may produce assignments for a globally distributed system, multiple assignment planners may be implemented within a given region, etc.

The assignment planner 225 may be responsible for computing and publishing the project-to-server assignment mappings, or assignments. In computing the assignments, the assignment planner 225 takes into account a variety of factors, such as a hierarchy of the organization and projects to be assigned, on-demand compute consumption, storage volume (e.g., by organization), server storage and compute capacities, etc. In some examples, the assignment planner 225 may also take into account compute reservations, such as resources guaranteed to a particular customer. To get the latest reservation information, for example, the assignment planner 225 may subscribe to periodic update, receive push notifications when new reservations are made, etc. The information considered by the assignment planner 225 in generating a new assignment scheme may include historical query information, such as metadata snapshots, datasets, and the like.

Periodically, the assignment planner 225 may fetch data from sources and predict future events, taking such predictions into account in determining assignments. For example, the assignment planner 225 may predict turndown, that a customer is about to send large amounts of data, potential reservation changes, etc. Such events may impact server size, project storage, or other constraints.

The assignment planner 225 may include a number of components, such as an input collector/analyzer 232, and one or more solvers 236. It should be understood that these components are merely examples, and that additional, fewer, or different components may be included in the assignment planner 225

The input collector/analyzer 232 collects and analyzes the input data 210 of the system. The input data 210 may include computing device data 250 from which the project assignment redistribution among the computing devices may be determined. Such computing device data 250 may be provided from each of the computing devices of the system. For each computing device, the computing device data 250 may include a list of projects 260 that are assigned to the computing device 250, and a respective storage requirement 262 of each project. The storage requirement 262 may indicate the total amount of storage resources consumed by the project at the computing device. For each computing device, the computing device data 250 may further include a list of one or more storage buffers 270 associated with the computing device. Each buffer may be assigned a respective storage capacity level 272 and a respective weighting 274. As described in greater detail herein, for a given buffer 270, a cost of consuming storage resources at the computing device in excess of the storage capacity level 272 of the buffer may be weighted according to the corresponding weighting 274. In some examples, the weighting 272 may be a fixed value, such that the cost of storage increases linearly as more storage resources are consumed. In other examples, the weighting 272 may be a function, such that the cost of storage may increase non-linearly as more storage resources are consumed.

Figures 3A, 3B, 3C:
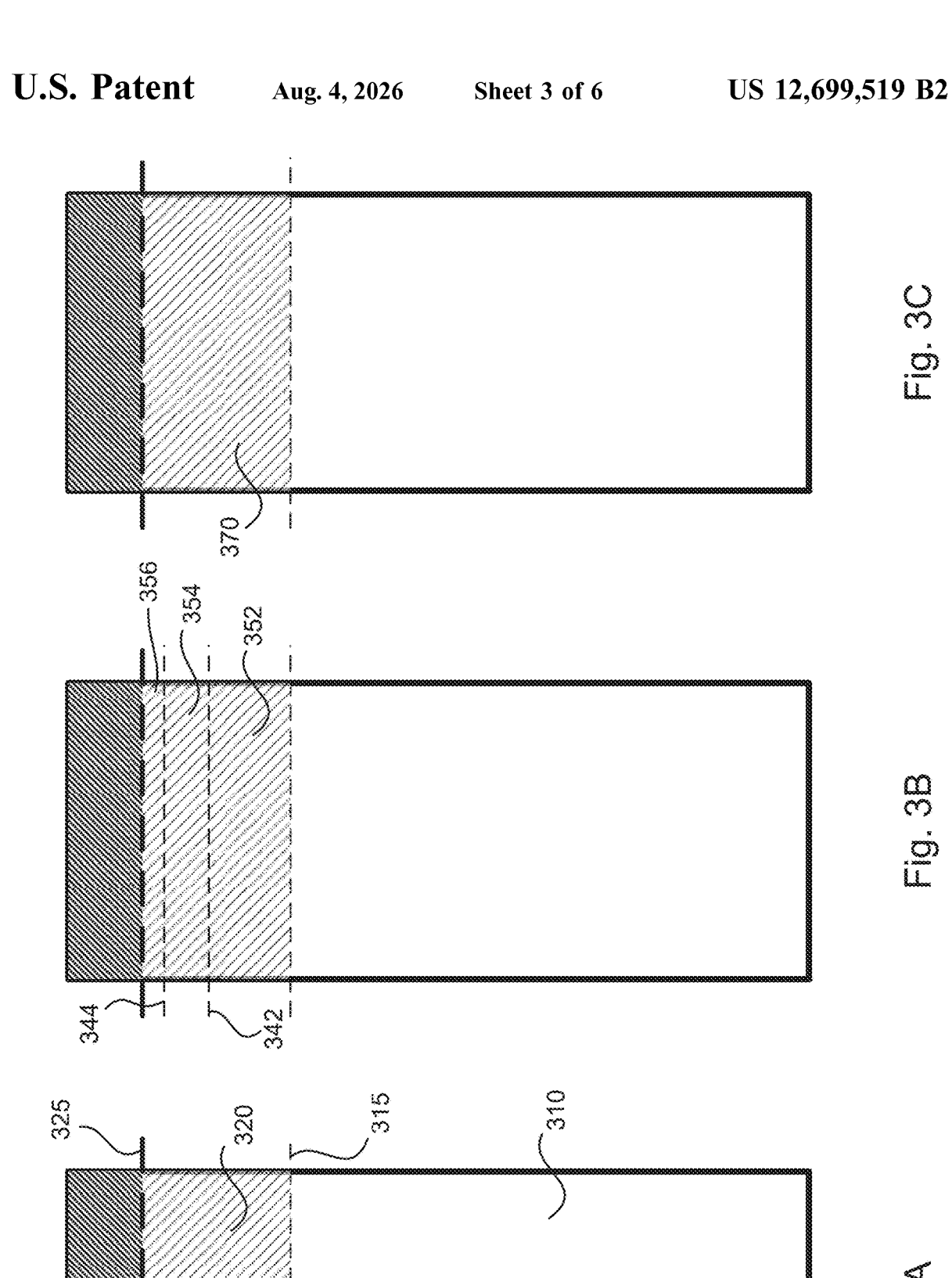
FIGS. 3A-3C are illustrations of example buffer constraints of a computing device according to an aspect of the present disclosure.

FIGS. 3A, 3B and 3C illustrate example buffers that may be associated with a computing device. Each example includes a bar 300 illustrating storage capacity of the computing device, whereby a bottom of the bar 300 corresponds to 0% storage capacity and the top of the bar 300 corresponds to 100% storage capacity.

In the example of FIG. 3A, storage capacity of the computing device is divided into three regions. A first region 310 corresponds to a range of storage capacity levels that do not exceed a first threshold value associated with a first buffer 315. A second region 320 corresponds to a range of storage capacity levels that exceed the first threshold value associated with the first buffer 315 but do not exceed a second threshold value associated with a second buffer 325. A third region 330 corresponds to a range of storage capacity levels that exceed both the first and second threshold values.

The second buffer 325 may be a growth buffer, corresponding to storage capacity reserved for growth of projects that are already stored at the computing device. The growth buffer may be a hard buffer, whereby storage of new projects at the computing device may be restricted when a storage capacity of the computing device exceeds the second threshold value.

The first buffer 315 may be a soft buffer. The soft buffer may not restrict storage of new projects at the computing device, but may indicate when storage at the computing device is approaching the growth buffer or maximum storage capacity. The difference between 100% capacity and the soft buffer may be greater than the difference between 100% capacity and the growth buffer, meaning that as storage consumption increases at the computing device, the threshold value of the soft buffer may be crossed before the threshold value of the growth buffer.

The first buffer may be associated with a first weighting value. The first weighting value may be used to adjust a cost of storing additional projects at the computing device. For instance, when storage consumption at the computing device is below the first threshold, a cost of storing an additional project may be equal to the amount of storage that the additional project consumes. But when storage consumption at the computing device is above the first threshold, the cost of storing an additional project may be equal to the amount of storage that the additional project consumes multiplied by the weighting value. Similarly, when storage consumption at the computing device is below the first threshold but adding the additional project pushes the storage consumption above the first threshold, then the cost of storing an additional project may be equal to a sum of (i) the amount of storage that the additional project consumes below the first threshold and (ii) the amount of storage consumption that exceeds the first threshold multiplied by the weighting value. In this regard, the first buffer 315 may impose an added cost on storage of new projects at the computing device when storage consumption exceeds the first threshold.

A total cost of storing a next project at the computing device (Cost) may be characterized according to the following equation:

$$Cost = K_1 \cdot B_1 \qquad (1)$$

in which $B_1$ is the storage consumption exceeding the first threshold value of the first buffer 315 and $K_1$ is the weighting value. In the above example, storage consumption below the first buffer is not factored into the cost, although in other examples the storage consumption below the first buffer may be added to the overall cost.

In the example of FIG. 3B, the second region 320 of the storage capacity bar 300 is divided into multiple subregions. Each subregion may be considered its own soft buffer region and may be associated with a different weighting value. For instance, when storage consumption at the computing device exceeds the first threshold of the first buffer 315 but does not exceed the second threshold of the second buffer 342, then a cost of storing an additional project may be equal to the amount of storage that the additional project consumes multiplied by a first weighting value associated with passing buffer 315 into region 352. When storage consumption at the computing device exceeds the second buffer 342 but does not exceed the third buffer 344, then a cost of storing an additional project may be equal to the amount of storage that the additional project consumes multiplied by a second weighting value associated with passing buffer 342 into region 354. When storage consumption at the computing device exceeds the third buffer 344, then a cost of storing an additional project may be equal to the amount of storage that the additional project consumes multiplied by a third weighting value associated with passing buffer 344 into region 356. For examples in which the growth buffer 325 is a hard buffer, these costs may assume that storage of the additional project does not exceed the hard buffer, since if the hard buffer were exceeded, then the new project would not be stored at the computing device anyhow.

In the example of FIG. 3B, the total cost of storing a next project at the computing device may be characterized according to the following equation:

$$Cost = K_1 \cdot B_1 + K_2 \cdot B_2 + K_3 \cdot B_3 \qquad (2)$$

in which $B_1$ is the storage consumption exceeding the first threshold of the first buffer 315, $B_2$ is the storage consumption exceeding the second threshold of the second buffer 342, $B_3$ is the storage consumption exceeding the third threshold of the third buffer 344, and $K_1$, $K_2$, and $K_3$ are the first, second and third weighting values, respectively. As with the example of FIG. 3A, storage consumption below the first buffer is not factored into the cost, but in other examples may be added to the overall cost.

The weighting values of the example of FIG. 3B may be different from one another or may be the same. In either case, as the storage consumption of the computing device increases past additional buffers, storing a further project at the computing device becomes increasingly costly.

In the examples of FIGS. 3A and 3B, the weighting values are fixed values, meaning that within a given buffer region or subregion, the costs for adding new projects increase linearly. However, in other examples, the weighting values may be non-linear. for instance, instead of applying a fixed weighting value to storage consumption in excess of a threshold value, a function may be applied. In such an instance, the total cost of storing a next project at the computing device may be characterized according to the following equation:

$$Cost = f(B_1) \qquad (3)$$

in which a function f( ) is applied to the amount of storage consumption exceeding the first threshold of the first buffer 315. The function may be chosen to appropriately increase costs as the amount of storage consumption increases. For instance, an exponential function of degree n polynomial, in which n is equal to 2 or more, may be applied.

FIG. 3C illustrates an example of a buffer applying a cost that increases non-linearly. Since the increase is non-linear, region 370 may be considered a single unified region since the weighting applied to region 370 may be characterized in a single non-linear function. In should be appreciated, nonetheless, that In other instances, multiple buffers may be characterized using different non-linear functions, or a combination of both linear and non-linear functions.

Returning to FIG. 2, the input data may further include additional data 280 relating to other factors on which the redistribution of project assignment among the computing devices may be based. One example factor is a cost of transferring the assignment of a project between computing devices since the transfer required data to be transmitted from one computing device to another computing device. Another example factor is project clusters. Projects may be clustered if they are executed on common data sets, whereby those common data sets may be stored at or close to the computing device of the project cluster. If reassigning a project from one computing device to another computing device causes projects executed on the same data set to be unclustered, then this may factor against the reassignment. Conversely, if reassigning a project from one computing device to another computing device causes projects executed on the same data set to be clustered, then this may factor in favor of the reassignment.

The input collector/analyzer 232 of the assignment planner 225 may receive these and other project inputs from metadata snapshots of each project. The metadata may include additional information for determining an arrangement of project assignments, such as organization information for each project, reservation information for the projects, both soft and hard groupings for data sets and projects, dependency relationships between data sets and projects based on historical data such as a query history, and so on.

The assignment planner 225 may use a solver 236 to compute a viable assignment. The solver may be, for example, a naïve solver, a greedy algorithm solver, an optimized solver such as a mixed integer problem solver, or any other type of solver. The solver 236 takes the inputs and runs an assignment algorithm. The assignment solver 236 may output a set of project assignments based on the received inputs 210.

The assignment planner 225 may output the set of project assignments determined by the solver 236 to an assignment map 240 for mapping the determined location assignments of the projects executed in the distributed system 100. The assignment map 240 may be used by an assignment redistribution controller 250 to redistribute the projects across the distributed network according to the assignment map 240. Redistribution may involve moving a project from one computing device to another computing device, creating replicas of projects, and so on. The assignment redistribution controller 250 may be implemented as a library in the balancer 220.

The assignment planner 225 may run continuously, on a schedule, on demand, or in response to an environmental change or configuration change. It may operate in a dry-run mode, where it generates assignments but does not apply them, or in an autonomous mode, where it automatically sends newly generated assignments to the assignment redistribution controller 250 for immediate application.

Example Methods

Example routines performed by the assignment planner, such as the assignment planner 225 of FIG. 2, is described in greater detail in connection with the diagrams of FIGS. 4-6. It should be understood that the routines described herein are merely examples, and in other examples, certain steps may be added, subtracted, replaced or reordered.

At block 410, for a given computing device of the system, one or more processors of the assignment planner may determine an amount of used storage at the computing device exceeding a predefined threshold value and that is less than the available storage capacity. The amount of used storage at the computing device may be characterized in terms of the percentage of storage consumption at the computing device. Percentages may be advantageous when comparing storage consumption between computing devices with different overall storage capacities. Alternatively, storage capacity may be characterized in terms of the amount of memory used, such as when all computing devices have the same amount of available capacity.

At block 420, for the same given computing device, the one or more processors of the assignment planner may calculate a storage cost based on the determined amount of used storage exceeding the first threshold value. The storage cost may be a cost for storing an additional project or predefined amount of data at the computing device. Calculating the storage cost may involve multiplying the determined amount of used storage exceeding the predefined first threshold value by a predefined first constant value. The constant value may be considered a weighting value designed to penalize storage costs in excess of the first threshold value.

Blocks 410 and 420 may be executed for each of the computing devices of the systems, such that the cost of storing an additional project for each computing device may be compared to one another. Also, the example routine 400 of FIG. 4 generally describes calculating a storage cost based on a single threshold value. However, in some examples, multiple threshold values may be associated with each computing device. An example of storage cost calculation based on multiple threshold values is shown in the example subroutine 500 of FIG. 5.

Once storage costs for each of the computing devices have been calculated, operations may proceed to block 430, in which the one or more processors of the assignment planner may determine a total storage cost of the system based on a sum of the calculated storage costs. The total storage cost of the system may indicate whether projects stored in the system are or are not properly balanced. For instance, if all projects are stored at a single computing device or few computing devices, then the storage consumption at the single or few computing devices may exceed the respective threshold values, meaning that the storage cost at those single or few computing devices is penalized according to the corresponding weighting values, thus increasing the overall storage cost of the system in turn. By contrast, if all projects are stored evenly across the computing devices of the system, then it may be possible to avoid or minimize storage consumption at the computing devices exceeding the respective threshold values, meaning that the storage cost at those single or few computing devices is not penalized, or minimally penalized, according to the corresponding weighting values, thus maintaining a small overall storage cost of the system in turn.

At block 440, the one or more processors of the assignment planner may determine a redistribution of one or more projects stored at the system that reduces the total storage cost of the system. As described herein, the assignment planner may include a solver that operates according to an algorithm, such as a greedy solver, a mixed integer solver, or other known solvers. The redistribution may involve moving at least one project from one computing device to another computing device. Additionally or alternatively, the redistribution may involve adding at least one new project to at least one of the computing devices of the systems.

At block 450, the one or more processors of the assignment planner may instruct the storage controller to execute the determined redistribution. The storage controller may then execute the instructed redistribution, whereby the projects may be reallocated from one computing device to another comping device, and transported through a network connecting the computing device of the system according to the reallocation. The redistribution may result in a lowered overall storage cost for the system as a whole.

At block 460, the redistribution of project assignments may be logged. Logging may be performed at a routing map, which may be stored at the assignment planner or in memory separate from the assignment planner. The routing map may indicate a respective location of each project stored in the system, as well storage locations of the data sets that the assigned projects may operate on. Operations in the system may be performed according to the routing information stored in the routing map. Thus, when projects are relocated according to a redistribution determination by the assignment planner, updating the log to reflect the redistribution may avoid miscommunications within the system during operation of one or more reallocated projects.

If the amount of storage in the system is so high that some amount of storage capacity in excess of the buffer threshold, then the optimization function stops functioning as a tool to balance storage costs between devices. For example, if two computing devices have a capacity of 20 PB each, and a buffer is set at 10 PB for each of the computing devices, then after 20 PB of total storage is consumed in the system and evenly divided between the two devices, there is no difference in cost between different storage arrangements. For example, the overall storage cost of storing 15 PB in one device and 15 PB in the other device is the same as the overall storage cost of storing 19 PB in one device and 11 PB in the other device, despite the clear imbalance of the latter arrangement. Therefore, in order more dynamically respond to growth of storage consumption in computing devices, multiple buffers may be implemented.

Figure 5:
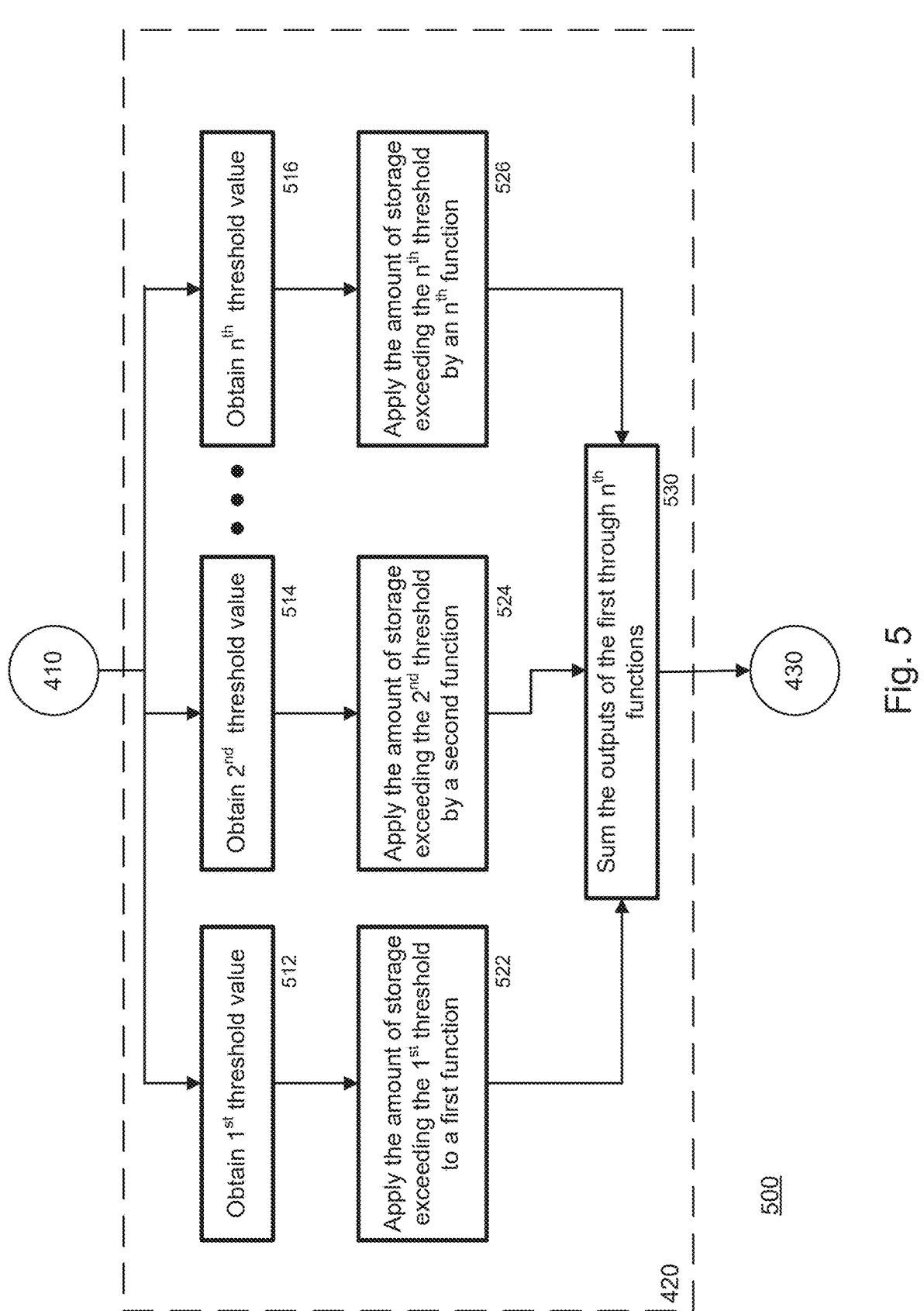
FIGS. 5 and 6 are flow diagrams of example subroutines of the routine of FIG. 4.

FIG. 5 is an example subroutine 500 for calculating the storage cost of a computing device in which multiple buffers are implemented. The multiple buffers may be arranged as described in connection with FIG. 3B herein, or according to a different arrangement. At block 512, the first threshold value associated with a first buffer is obtained. At block 522, the amount of storage exceeding the first threshold value is applied to a first function. In the example of FIG. 3B, the function is shown as a linear function, in which the excess storage is multiplied by a predetermined weighting value. However, in other examples, such as in FIG. 3C, the function may be a non-linear function.

Similar operations may be executed for each of the other buffers of the computing device. For instance, in FIG. 5, blocks 514 and 524 depict a second threshold value being obtained and an amount of storage exceeding the second threshold value being applied to a second function, which may or may not be the same as the first function. In a case of the first and second functions being the same, this may involve applying the function once to the amount of storage consumption that is greater than the first threshold value but less than the second threshold value, but applying the function twice to the amount of storage consumption that is greater than the second threshold value. For instance, if the function is a linear function and the weighting value is 1.2, then for a computing device with a first threshold at 70% capacity and a second threshold at 80% capacity, the cost calculated at 85% capacity may be equal to (85−70)*1.2+ (85−80)*1.2.

The number of multiple buffers and respective threshold values may be set to any number n greater than or equal to 2. In FIG. 5, this is represented by blocks 516 and 526, which depict an nth threshold value being obtained and an amount of storage exceeding the nth threshold value being applied to an nth function.

At block 530, the calculated costs from each of blocks 522, 524 to 526 may be summed in order to derive a total cost of storage consumption at the computing device. This value may be output from block 530 to block 430 of the routine 400 of FIG. 4, and operations may proceed as described in connection with FIG. 4.

The routine 400 of FIG. 4 generally describes an assignment planner rebalancing storage across multiple computing devices using storage cost as a sole factor. However, in other instances, storage cost may be one of multiple factors for which the assignment solver of the assignment planner optimizes the project assignment distribution. FIG. 6 is a subroutine 600 of routine 400 depicting how the routine 400 may take other factors into account to determine the redistribution of projects across the system.

Figure 6:
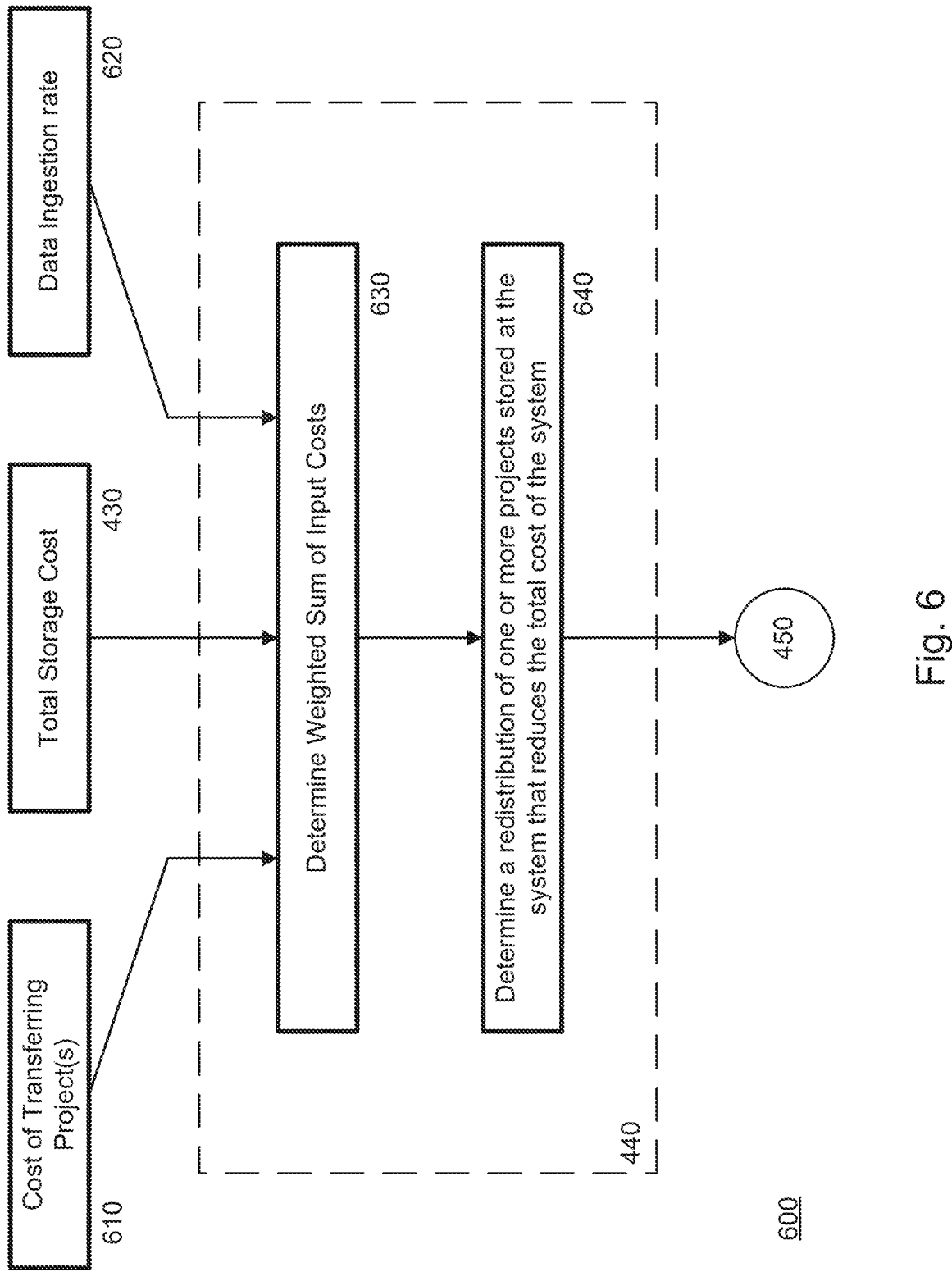

Blocks 610 and 620 of FIG. 6 depict secondary inputs to the assignment planner. Block 610 represents a cost of transfer input indicating a cost for moving a project from one computing device to another computing device. Block 620 depicts data ingestion rate input indicating a cost of transporting data from a data set on which a project operates for a given assignment plan of project. These inputs should be understood as examples of possible inputs to the system, as other inputs reflecting other project assignment factors may also be received by the assignment planner.

At block 630, the one or more processors of the assignment planner may determine a sum of the received cost inputs for a given set of project assignments. Different factors within the sum may be weighted differently, such as according to their relative importance. For instance, in one example system, transporting projects from one computing device to another may be especially costly, whereby the cost of this factor may be greater than for other factors. In another example system designed for projects with a high degree of clustering, there may be added emphasis on data ingestion for operating the projects, in which case the weight of the data ingestion rate cost may be increased. Other weightings of various factors may be set as suitable for each given system.

At block 640, the one or more processors of the assignment planner may determine a redistribution of one or more projects stored at the system that reduces the total cost of the system. In the case of FIG. 6, reducing the total cost may or may not involve reducing the total storage cost. For instance, in a given scenario, the cost of increasing storage imbalance may be outweighed by the cost savings in decreasing other cost factors of the system. Nonetheless, in many scenarios, reducing the total cost will also result in a reduction of the total storage cost.

The determined redistribution of projects may be output from block 640, and operations may continue with block 450 as described in connection with the routine 400 of FIG. 4.

The above examples generally describe redistribution of one or more projects among a plurality of individual computing devices such as computers, servers, and the like. However, it should be understood that the same or similar principles may be applied to other network architectures, such as those utilizing "cells." For example, a cell is a network of tightly connected computing devices that, by way of example, may cooperatively run processes, has shared storage, and has very low network latency and high throughput between computing devices in the cell. Accordingly, while the examples herein are primarily described with respect to calculating storage costs and other costs for individual computing devices, it should be understood that the same or similar calculations may be performed for groups of computing devices such as cells. Likewise, while the examples herein are primarily described with respect to assigning projects to individual computing devices, it should be understood that the same or similar assignment mappings may be generated and instructions may be transmitted for assigning projects and data sets to groups of multiple computing devices such as cells, it should be understood that the examples similarly apply in assigning projects to groups of multiple computing devices such as cells.

For example, a system may include multiple computing cells, each computing cell including numerous computing devices and having assigned to it multiple projects. Compute loads may differ greatly from project to project, meaning that some projects may consume more compute cell resources than other projects. The methods and systems of the present disclosure can achieve a storage balance, as well as load balancing, between cells by reassigning projects from one cell to another in accordance with the principles described herein. As a result, storage allocation as well as other factors may be properly and dynamically balanced throughout the system. In the case of storage balancing, the optimized dynamic storage balancing may make it possible to operate computing devices or cells with smaller hard buffers, while at the same time minimizing the risk of hitting a hard buffer or reaching full capacity of a computing device or cell. This may result in fewer errors experienced by projects stored in the system, resulting in turn in less downtime and failures, and overall an improved user experience.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of balancing data storage among a plurality of computing nodes, each computing node comprising one or more respective computing devices, each computing node having an available capacity, the method comprising:
    for a given computing node of computing devices:

determining for the given computing node, by one or more processors, a measure of used capacity exceeding a predefined first threshold value that is less than the available capacity;
    calculating, by the one or more processors, a cost based on the determined measure of used capacity exceeding the predefined first threshold value; and
    determining, by the one or more processors, a transfer of one or more projects from the given computing node that reduces the calculated cost, wherein determining the transfer is performed using a solver; and
    outputting, by the one or more processors, one or more control signals to the given computing node to execute the determined transfer of one or more projects to balance the data storage among the plurality of computing nodes.

2. The method of claim 1, wherein the available capacity of each computing node further includes a hard buffer to which storage of new projects at the computing node is restricted, wherein the first threshold value is greater than a difference between the available capacity and a size of the hard buffer.

3. The method of claim 1, wherein calculating the cost comprises multiplying the determined measure of used capacity exceeding the predefined first threshold value by a predefined first constant value.

4. The method of claim 3, further comprising, for the given computing node, determining for the given computing node, by the one or more processors, a measure of used capacity exceeding a predefined second threshold value that is less than the available capacity, the second threshold value being greater than the first threshold value, wherein calculating the cost comprises multiplying the determined measure of used capacity exceeding the predefined second threshold value by a predefined second constant value.

5. The method of claim 4, wherein the predefined second constant value is greater than or equal to the predefined first constant value.

6. The method of claim 3, further comprising, for the given computing node, determining for the given computing node, by the one or more processors, a measure of used capacity exceeding n predefined threshold values, each predefined threshold value being less than the available capacity, wherein n is an integer equal to or greater than two, and wherein calculating the cost comprises multiplying the determined measure of used capacity by one of n predefined constant values depending on how many of the n predefined threshold values the measure of used capacity at the given computing node exceeds.

7. The method of claim 1, wherein calculating the cost comprises inputting the determined measure of used capacity exceeding the predefined first threshold value to a non-linear function.

8. The method of claim 1, further comprising:
    determining, by the one or more processors, one or more secondary cost factors associated with transferring the one or more projects between the plurality of computing nodes;
    assigning, by the one or more processors, a first weighting value to the calculated cost and a respective weighting value to each of the one or more secondary factors; and
    calculating, by the one or more processors, a sum of the weighted calculated cost and the weighted secondary cost factors,
    wherein the determined transfer of the one or more projects between the computing nodes reduces the calculated sum.

9. The method of claim 8, wherein the one or more secondary cost factors includes a network bandwidth cost of transferring the one or more projects between the computing nodes.

10. The method of claim 8, wherein the one or more secondary cost factors includes a network communication cost of communicating data between the computing nodes.

11. A system of balancing data storage among a plurality of computing nodes, each computing node comprising one or more respective computing devices, each computing node having an available capacity, the system comprising:
   one or more memories; and
   one or more processors in communication with the one or more memories, the one or more processors configured to:
   for a given computing node:
      determine, for the given computing node, a measure of used capacity exceeding a predefined first threshold value that is less than the available capacity; and
      calculate a cost based on the determined measure of used capacity exceeding the predefined first threshold value;
      determine a transfer of one or more projects between the computing nodes that reduces a total cost, wherein the determination of the transfer is performed by the one or more processors using a solver; and
      output control signals to the plurality of computing nodes to execute the determined transfer of one or more projects between the computing nodes to balance the data storage among the plurality of computing nodes.

12. The system of claim 11, wherein the available capacity of each computing node further includes a hard buffer to which storage of new projects at the computing node is restricted, wherein the first threshold value is greater than a difference between the available capacity and a size of the hard buffer.

13. The system of claim 11, wherein the one or more processors are configured to calculate the cost by multiplying the determined measure of used capacity exceeding the predefined first threshold value by a predefined first constant value.

14. The system of claim 13, wherein the one or more processors are configured to, for the given computing node, determine for the given computing node, an measure of used capacity exceeding a predefined second threshold value that is less than the available capacity, the second threshold value being greater than the first threshold value, wherein the one or more processors are configured to calculate the cost by multiplying the determined measure of used capacity exceeding the predefined second threshold value by a predefined second constant value.

15. The system of claim 14, wherein the predefined second constant value is greater than or equal to the predefined first constant value.

16. The system of claim 13, wherein the one or more processors are configured to, for the given computing node, determine for the given computing node, a measure of used capacity exceeding n predefined threshold values, each predefined threshold value being less than the available capacity, wherein n is an integer equal to or greater than two, and wherein the one or more processors are configured to calculate the cost by multiplying the determined measure of used capacity by one of n predefined constant values depending on how many of the n predefined threshold values the measure of used capacity at the given computing node exceeds.

17. The system of claim 11, wherein the one or more processors are configured to calculate the cost by inputting the determined measure of used capacity exceeding the predefined first threshold value to a non-linear function.

18. The system of claim 11, wherein the one or more processors are configured to:
   determine one or more secondary cost factors associated with transferring the one or more projects between the plurality of computing nodes;
   assign a first weighting value to the calculated cost and a respective weighting value to each of the one or more secondary factors; and
   calculate a sum of the weighted calculated cost and the weighted secondary cost factors, wherein the determined transfer of the one or more projects between the computing nodes reduces the calculated sum.

19. The system of claim 18, wherein the one or more secondary cost factors includes a network bandwidth cost of transferring the one or more projects between the computing nodes.

20. The system of claim 18, wherein the one or more secondary cost factors includes a network communication cost of communicating data between the computing nodes.

* * * * *